(12) United States Patent
Svensson et al.

(10) Patent No.: US 7,140,834 B2
(45) Date of Patent: Nov. 28, 2006

(54) TURBINE AND A COMPONENT

(75) Inventors: Jan Svensson, Goteborg (SE); Eva Dahl, Trollhattan (SE); David Russberg, Trollhattan (SE); Roger Sjoqvist, Trollhattan (SE); Jan Nilsson, Vanersborg (SE); Sten Johansson, Vanersborg (SE)

(73) Assignee: Volvo Aero Corporation, Trollhättan (SE)

( * ) Notice: Subject to any disclaimer, the term of this patent is extended or adjusted under 35 U.S.C. 154(b) by 0 days.

(21) Appl. No.: 10/904,915

(22) Filed: Dec. 3, 2004

(65) Prior Publication Data

US 2006/0233636 A1    Oct. 19, 2006

Related U.S. Application Data

(63) Continuation of application No. PCT/SE03/00924, filed on Jun. 4, 2003.

(60) Provisional application No. 60/319,294, filed on Jun. 5, 2002.

(30) Foreign Application Priority Data

Jun. 5, 2002    (SE)    .................................... 0201735

(51) Int. Cl.
F01D 21/00    (2006.01)
(52) U.S. Cl. ..................... 415/9; 415/173.4; 415/214.1
(58) Field of Classification Search .................... 415/9, 415/173.4, 174.4, 173.1, 121.2, 214.1
See application file for complete search history.

(56) References Cited

U.S. PATENT DOCUMENTS

| 4,417,848 | A | | 11/1983 | Dembeck ......................... 415/9 |
|---|---|---|---|---|
| 4,534,698 | A | | 8/1985 | Tomich ........................... 415/9 |
| 5,516,257 | A | | 5/1996 | Kasprow et al. .......... 415/121.2 |
| 5,622,472 | A | * | 4/1997 | Glowacki ......................... 415/9 |
| 6,059,523 | A | * | 5/2000 | Modafferi et al. .............. 415/9 |

* cited by examiner

*Primary Examiner*—Edward K. Look
*Assistant Examiner*—Dwayne J White
(74) *Attorney, Agent, or Firm*—Novak Druce & Quigg, LLP

(57) ABSTRACT

A turbine including a rotor (1) that is driven by gas and that has a housing (2) enclosing the rotor. The turbine includes a component (6) suspended from the housing (2) that is arranged inside the housing (2) and at least partially beside the rotor (1) with respect to the direction (5) of the gas flow in order to impede any fragments which may come loose from the rotor from penetrating the housing in radial direction.

16 Claims, 3 Drawing Sheets

TURBINE AND A COMPONENT

CROSS-REFERENCE TO RELATED APPLICATIONS

The present application is a continuation patent application of International Application No. PCT/SE03/00924 filed 4 Jun. 2003 which was published in English pursuant to Article 21(2) of the Patent Cooperation Treaty, and which claims priority to i) Swedish Application No. 0201735-8 filed 5 Jun. 2002; and ii) U.S. Provisional Application No. 60/319,294 filed 5 Jun. 2002. Said applications are expressly incorporated herein by reference in their entireties.

FIELD OF THE INVENTION

The present invention relates to a turbine comprising (including, but necessarily limited to) a rotor driven by gas and a housing enclosing the rotor, as well as to a component for protecting such a housing that encloses a turbine having a gas-driven rotor.

BACKGROUND OF THE INVENTION

In the field of gas turbines, in particularly within the aircraft industry, there are many security regulations which have to be fulfilled. One of these is the so-called containment requirement which means that if any fragments, such as a turbine blade or a part thereof, for some reason come loose from the rotor of the turbine, such fragments must be retained within the housing enclosing the rotor to prevent the fragments from damaging other parts of for example an airplane. This in turns means that the wall of the housing has to be dimensioned to fulfill this requirement.

Although the invention will be described with respect to a gas turbine of an airplane engine, and in particular in the region of the turbine where a first part enclosing the rotor, such as a low-pressure turbine case, and a second part arranged downstream the first part with respect to the gas flow, such as a turbine rear frame, are interconnected, the invention is not in any way restricted to this particular embodiment, but may be used in many ways in turbines of different types.

In a low-pressure turbine, not only does the low-pressure turbine case have to fulfill the containment requirement, but also the regions upstream and downstream of the rotor have to fulfill this requirement. This means that the turbine rear frame downstream the rotor has to be dimensioned to fulfill the containment requirement.

According to known designs, the containment requirement is fulfilled by dimensioning the thickness of the wall of the structure which encloses the rotor, or in another way is arranged adjacent to the rotor so that any fragments which may come loose from the rotor are stopped by the wall.

However, in cases where material having a low energy reception capacity is used, for example in a turbine rear frame and/or if the rotor of for example the low-pressure turbine has high kinetic energy, a thick wall could cause problems. Such a thick wall of the turbine rear frame (or rather of the outer ring of the turbine rear frame, which outer ring is arranged close to the rotor) means that this ring becomes more rigid and has a slower thermal response. This implies a shorter service life of the construction in the region where the requisite struts and/or guide vanes are connected to the ring.

A known alternative solution is to design the low-pressure case with a length such that it extends along the whole region where the containment requirement has to be fulfilled. In this case, a disadvantage is that the outer ring of the front section of the turbine rear frame becomes very short for a given total length of the turbine, and this in turns leads to the same problem(s) discussed above.

SUMMARY OF THE INVENTION

An object of the invention is to provide a turbine and a component used in a turbine of the kind referred to above with the possibility of fulfilling the specified containment requirement, while at the same time reducing to a substantial extent the described disadvantages associated with known designs. By the provision of a component suspended from the housing of the turbine which component is arranged to impede any fragments which may come loose from the rotor from penetrating the housing in the radial direction; i.e., to protect the housing in a region beside the rotor, preferably downstream the rotor, in this region the housing itself may be dimensioned to not fulfill the containment requirement, but may be dimensioned to fulfill other desired characteristics of the housing downstream the rotor, such as low rigidity and fast thermal response, to increase the service life of the turbine, since the component according to the invention is used to fulfill the containment requirement in this region of the turbine.

According to a preferred embodiment of the invention, the component has first means cooperating with second means of the housing for suspending the component from the housing while enabling radial thermal expansion of the component relative to the housing.

Preferably the component is a ring arranged substantially concentrically relative to the rotor. In this way, the component is suspended from the housing "freely expandable" in a radial direction towards the housing and it is possible to achieve a good protection along the periphery of the housing at the same time as the housing is not affected by the component even if the component moves in a radial direction towards the housing due to thermal expansion in the operation of the turbine.

According to a further preferred embodiment of the invention, the housing comprises a first part enclosing the rotor and a second part arranged downstream the first part with respect to the direction of the gas flow, the first part and the second part being interconnected to each other. The component is arranged to protect the second part against any fragments which may come loose from the rotor. The invention has great advantages in this special case, since it has been found out that the problems of known designs discussed herein concerning the housing of the turbine are particularly difficult to avoid in regions where two parts are interconnected to constitute a continuous housing enclosing the internal parts of the turbine.

According to a further preferred embodiment of the invention, the component is designed (configured) to guide the gas to flow along a certain flow path. Hereby a further component, such as a conventional guiding sheet, for creating the desired flow path of the gas may be omitted.

The invention also relates to an airplane engine comprising a turbine or a component according to the invention.

Further advantages and advantageous features of the turbine and the component according to the invention are disclosed in the following description, including the claims.

BRIEF DESCRIPTION OF THE DRAWINGS

With reference to the appended drawings showing exemplary embodiments of the present invention, and in view of the detailed description found hereinbelow, the drawings may be characterized in the following ways.

DETAILED DESCRIPTION

Figure 1:
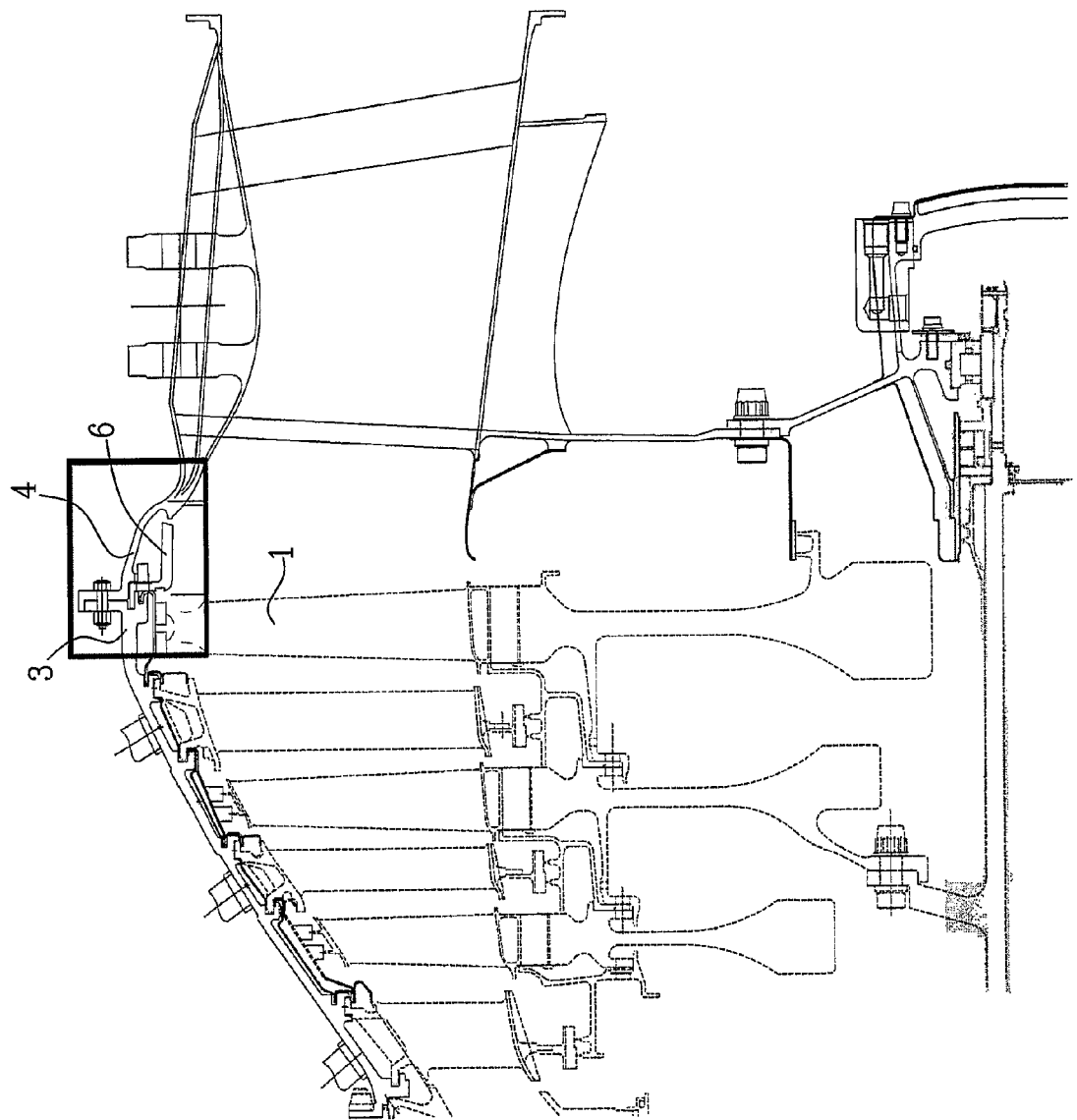
FIG. 1 is a cross-sectional view of a part of a turbine comprising a containment component configured according to the invention.
Figure 2:
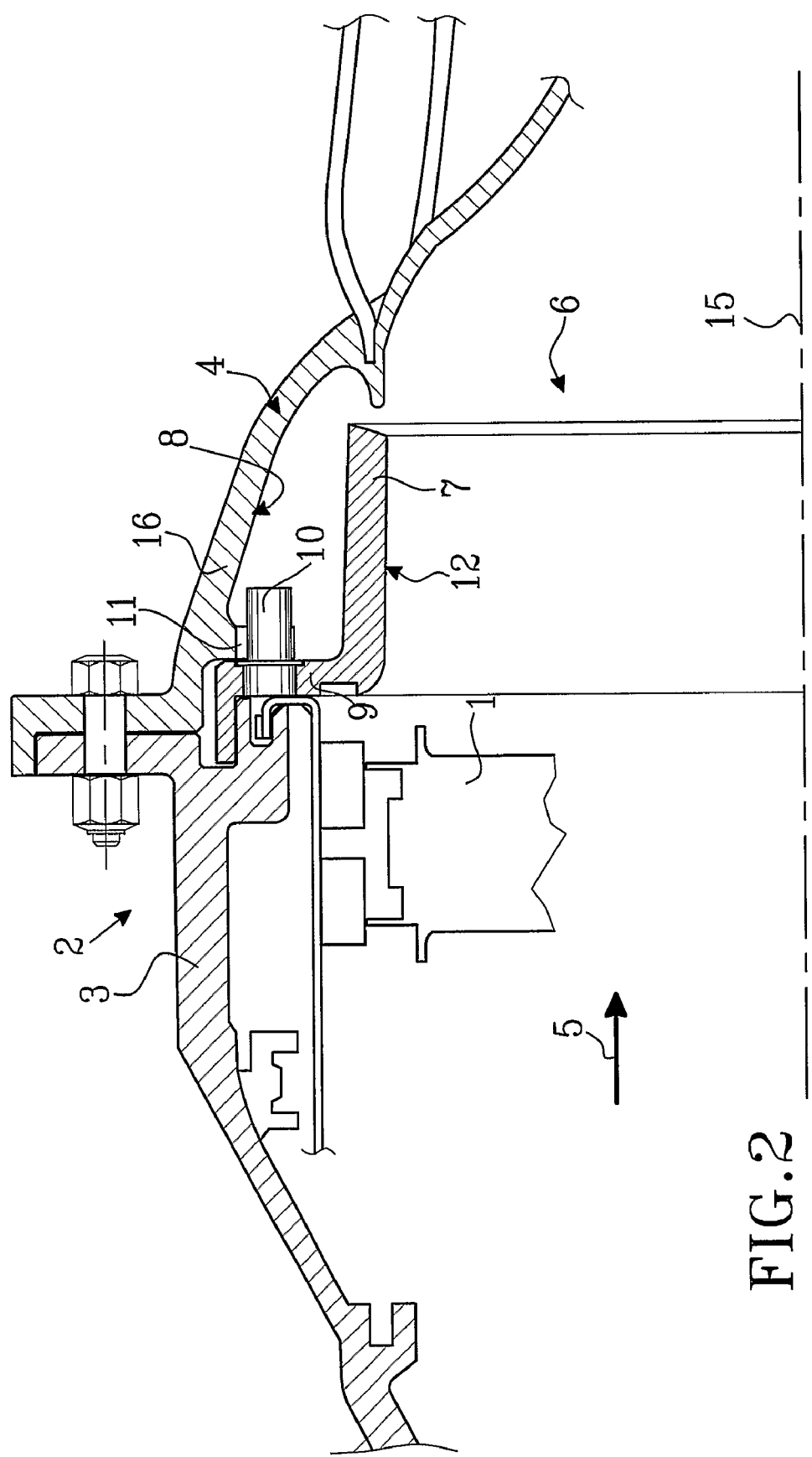
FIG. 2 is an enlarged view of a part of FIG. 1.

In FIGS. 1 and 2 a turbine comprising a rotor 1, driven by gas, and a housing 2 enclosing the rotor 1 is illustrated. FIG. 1 illustrates a section of the turbine where two parts 3,4 of the housing are interconnected to each other for creating a continuous housing. A first part 3, such as a low-pressure turbine case, encloses the rotor 1 and, downstream of the rotor with respect to the gas flow direction 5, a second part 4, such as a turbine rear frame, is arranged. These two parts 3,4 are mechanically interconnected to form the housing 2.

Inside the housing 2, a component 6 is arranged that is suspended from the housing. The component 6 is to be arranged at least partially beside the rotor 1, and preferably at least partially downstream from the rotor 1 in order to impede any fragments which may come loose from the rotor from penetrating the housing in the radial direction, or in a direction having at least one geometric component in the radial direction; i.e., for protecting the housing 2, primarily the front section 16 of the second part 4, against any fragments which may come loose from the rotor 1.

In the embodiment illustrated, the component 6 is arranged downstream of the rotor 1 and is designed as a tubular piece. In other words, the component is a ring 6, extending peripherally along the circular circumference of the housing 2. The ring 6 is arranged substantially concentrically relative to the rotor 1 and has a first portion 7 forming the circular ring shape which portion 7 has a longitudinal extension in the axial direction relative to the axis 15 of rotation of the rotor 1; that is, in the main direction 5 of the gas flow, to cover and protect the interior surface 8 of the second part 4 of the turbine housing 2 in the desired area. The first portion 7 extends substantially concentrically to and along the longitudinal extension of the outer ring 16 of the front section of the second part 4 of the housing 2. The ring 6, or rather the first portion 7 thereof, may be cylindrical, frusto-conical or the like. The length of the first portion 7 is of the magnitude several times the thickness of the material of the first portion, and preferably the length of the first portion 7 is in the same magnitude as the length of the outer ring 16 of the front section of the turbine rear frame 4.

Furthermore, the ring 6 has a second portion 9, such as a flange 9, which is designed with a main extension in the radial direction and substantially perpendicular to the first portion 7. The second portion 9 is provided with first means 10 cooperating with second means 11 of the housing 2 for providing the suspension while still enabling radial expansion of the component 6 relative to the housing 2. As an example, the second means are constituted by slots 11 extending in the radial direction for receiving of the corresponding first means constituted by pins 10 arranged in the ring 6 for suspending and guiding of the ring 6.

However, instead of slots extending through, for example, a flange 20 of the housing, shallower grooves could be used together with the pins or together with ridges or the like projecting from the ring.

The outer diameter of the second portion 9 of the ring 6 is smaller than the inner diameter of the corresponding part of the housing 2, and also the first portion 7 of the ring 6 is arranged spaced from the interior surface 8 of the housing 2. This means that the ring 6 is able to expand in the radial direction towards the housing without loading the housing. By the provision of a component 6 according to the invention being suspended "freely expandable" in the radial direction, the component is able to expand in the radial direction, due to heating of the component in operation, without affecting the housing to any great extent.

Figure 3:
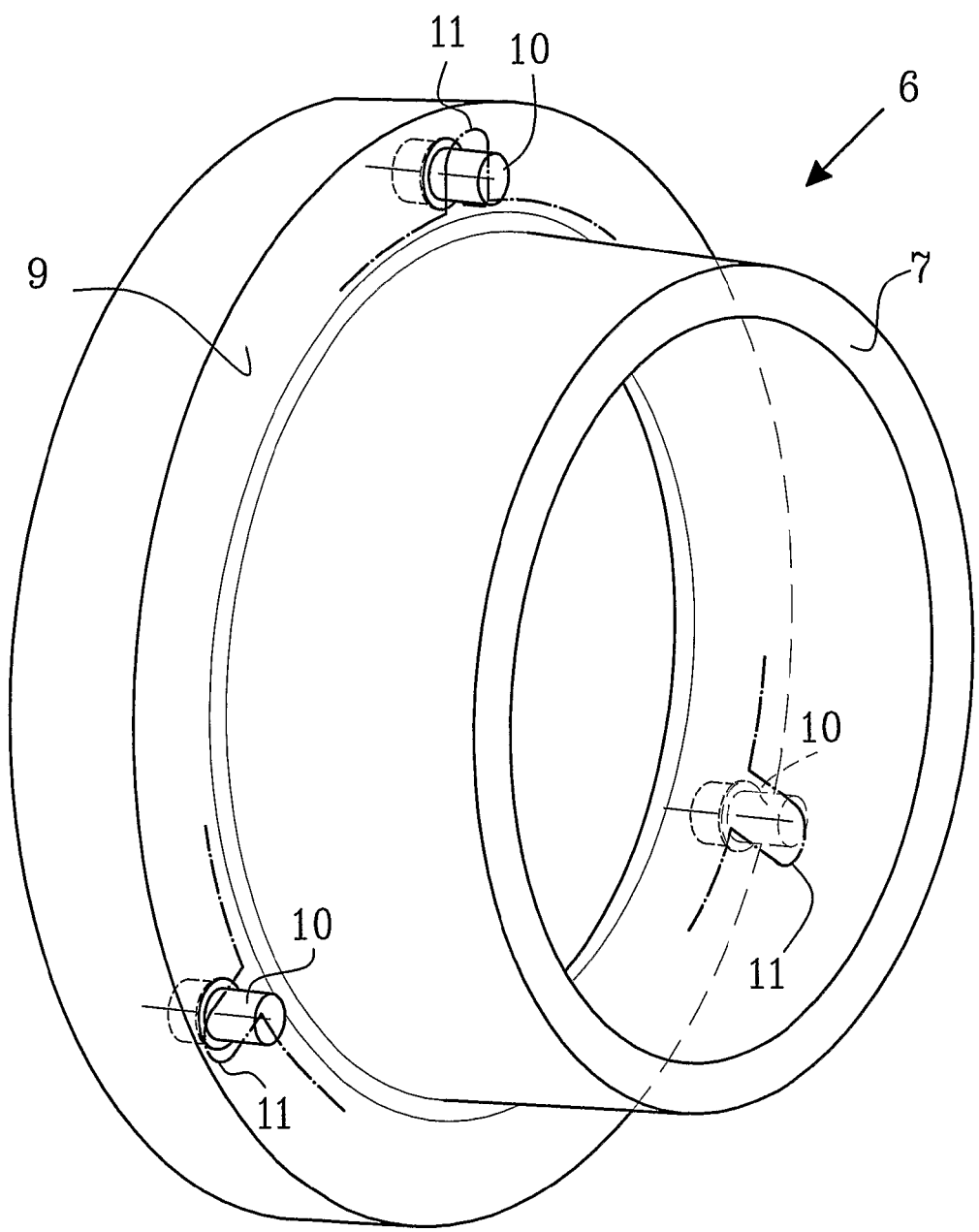
FIG. 3 is a perspective view of the containment component of FIGS. 1 and 2.

In FIG. 3, one embodiment of the component according to the invention is illustrated in a perspective view. The ring 6, i.e. the flange portion 9 thereof, is provided with three pins 10 arranged angular spaced by 120 degrees relative to each other along the periphery of the flange 9. The guiding pins 10 which are attached in the flange 9 by, for example, press fits, are located in the slots 11 of the housing for suspending and guiding the component 6. The slots 11 are schematically illustrated with dashed and dotted lines. Preferably, the flange 9 of the ring 6 may be designed with a lesser thickness of material than the first portion 7.

Although the slots are arranged in the housing and the guiding pins are arranged in the ring in the illustrated embodiment, the guiding pins could nevertheless be arranged in the housing and the slots in the ring. The number of guiding pins/slots and the location thereof may be varied in many ways within the scope of the invention. Furthermore, the guiding pins or the slots, when arranged in the housing, may be arranged in various parts of the housing, for example the low-pressure turbine case or the turbine rear frame.

In the embodiment illustrated, the component 6 is designed to guide the gas to flow along a certain flow path. The inner surface 12 of the ring 6 constitutes a delimiting surface to the gas in the region where the gas exits the first part 3 of the housing 2. This inner surface 12 extends substantially parallel to the main direction 5 of the gas flow and along the longitudinal extension of the outer ring of the front section of the second part of the housing. This ensures that the gas will tend to keep the intended flow path and flow in the axial direction with respect to the axis 15 of rotation of the rotor 1. This is important to avoid energy dissipation due to turbulence. In this manner the component 6 is used for two main purposes at the same time: the containment requirement and the guiding of the gas, and thus, a further conventional component, such as a guiding sheet, for guiding the gas in this area may be omitted.

It is to be understood that the present invention is not limited to the embodiments described above and illustrated in the drawings, but rather the skilled person will recognize that many changes and modifications may be made within the scope of the patent claims. For example, the dimensions and the material of the component according to the invention may be varied in many ways.

What is claimed is:

1. A turbine comprising:
   a rotor driven by gas;
   a housing enclosing the rotor;
   a component suspended from the housing, said component being arranged inside the housing and at least partially beside the rotor with respect to the direction of the gas flow in order to impede any fragments which may come loose from the rotor from penetrating the housing in the radial direction, wherein the component has first means cooperating with second means of the housing for suspending the component from the housing while enabling radial thermal expansion of the component relative to the housing.

2. The turbine as recited in claim 1, wherein the component is arranged at least partially downstream of the rotor.

3. The turbine as recited in claim 1, wherein the component is a ring arranged substantially concentrically relative to the rotor.

4. The turbine as recited in claim 1, wherein the first means are pins arranged in the component.

5. The turbine as recited in claim 1, wherein the second means are slots arranged in the housing.

6. A turbine comprising:
a rotor driven by gas;
a housing enclosing the rotor;
a component suspended from the housing, said component being arranged inside the housing and at least partially beside the rotor with respect to the direction of the gas flow in order to impede any fragments which may come loose from the rotor from penetrating the housing in the radial direction, wherein the component has a flange by means of which the component is suspended from the housing.

7. The turbine as recited in claim 6, wherein the flange is provided with the first means.

8. A turbine comprising:
a rotor driven by gas;
a housing enclosing the rotor;
a component suspended from the housing, said component being arranged inside the housing and at least partially beside the rotor with respect to the direction of the gas flow in order to impede any fragments which may come loose from the rotor from penetrating the housing in the radial direction, said housing comprises a first part enclosing the rotor and a second part arranged downstream of the first part with respect to the direction of the gas flow, the first part and the second part being interconnected to each other, and that the component being arranged to protect the second part against any fragments which may come loose from the rotor, wherein the second part forms a turbine rear frame.

9. The turbine as recited in claim 8, wherein the first part forms a low-pressure turbine case.

10. A turbine comprising:
a rotor driven by gas;
a housing enclosing the rotor;
a component suspended from the housing, said component being arranged inside the housing and at least partially beside the rotor with respect to the direction of the gas flow in order to impede any fragments which may come loose from the rotor from penetrating the housing in the radial direction, wherein the component is configured to guide the gas to flow along a certain flow path.

11. A turbine comprising:
a rotor driven by gas;
a housing enclosing the rotor;
a component suspended from the housing, said component being arranged inside the housing and at least partially beside the rotor with respect to the direction of the gas flow in order to impede any fragments which may come loose from the rotor from penetrating the housing in the radial direction, wherein the housing comprises a first part enclosing the rotor and a second part arranged downstream of the first part with respect to the direction of the gas flow, the first part and the second part being interconnected to each other, and that the component being arranged to protect the second part against any fragments which may come loose from the rotor, wherein the component is designed to guide the gas in the region where the gas exits the first part of the housing and passes into the second part of the housing.

12. A component for protecting a housing enclosing a turbine having a rotor driven by gas, said component being configured to be suspended from an inside of the housing and at least partially beside the rotor with respect to the direction of the gas flow in order to impede any fragments which may come loose from the rotor from penetrating the housing in the radial direction, wherein the component is provided with a flange, the component being configured to be suspended from the housing by means of the flange.

13. The component as recited in claim 12, wherein the component is configured to be located at least partially downstream the rotor.

14. The component as recited in claim 12, wherein the component is a ring configured to be positioned substantially concentrically relative to the rotor.

15. A component for protecting a housing enclosing a turbine having a rotor driven by gas, said component being configured to be suspended from an inside of the housing and at least partially beside the rotor with respect to the direction of the gas flow in order to impede any fragments which may come loose from the rotor from penetrating the housing in the radial direction, wherein the component is configured to guide the gas to flow along a certain flow path in the turbine.

16. An aircraft engine including a turbine, said turbine comprising:
a rotor driven by gas;
a housing enclosing the rotor;
a component suspended from the housing, said component being arranged inside the housing and at least partially beside the rotor with respect to the direction of the gas flow in order to impede any fragments which may come loose from the rotor from penetrating the housing in the radial direction, wherein the component is configured to guide the gas to flow along a certain flow path.

* * * * *